US012320197B1

(12) United States Patent
Huang et al.

(10) Patent No.: US 12,320,197 B1
(45) Date of Patent: Jun. 3, 2025

(54) POWER SYSTEM FOR ROLLER APPARATUS AND ROLLER APPARATUS

(71) Applicant: Xiamen Dongsheng Rong Technology Co., Ltd., Fujian (CN)

(72) Inventors: Junfeng Huang, Fujian (CN); Binfeng Yu, Fujian (CN); Yuehua Lu, Fujian (CN); Asheng Zhang, Fujian (CN); Hanqin Lin, Fujian (CN)

(73) Assignee: Xiamen Dongsheng Rong Technology Co., Ltd., Fujian (CN)

( * ) Notice: Subject to any disclaimer, the term of this patent is extended or adjusted under 35 U.S.C. 154(b) by 0 days.

(21) Appl. No.: 18/954,662

(22) Filed: Nov. 21, 2024

(30) Foreign Application Priority Data

Nov. 13, 2024 (CN) ......................... 202411611928.3

(51) Int. Cl.
*E06B 9/90* (2006.01)
*E06B 9/42* (2006.01)
*E06B 9/60* (2006.01)
*E06B 9/80* (2006.01)

(52) U.S. Cl.
CPC .................. *E06B 9/90* (2013.01); *E06B 9/42* (2013.01); *E06B 9/60* (2013.01); *E06B 2009/801* (2013.01)

(58) Field of Classification Search
CPC ..... E06B 9/90; E06B 9/42; E06B 9/60; E06B 2009/801
See application file for complete search history.

(56) References Cited

U.S. PATENT DOCUMENTS 11,891,856 B1 * 2/2024 Lei ........................... E06B 9/74
12,078,013 B1 * 9/2024 Huang ...................... E06B 9/60
2007/0284053 A1 * 12/2007 Mullet ...................... E06B 9/86 160/31
2014/0290870 A1 * 10/2014 Colson ...................... E06B 9/40 160/10
2018/0112461 A1 * 4/2018 Holt ........................ F16D 7/044
2019/0257146 A1 * 8/2019 Norton ...................... E06B 9/90
2020/0308907 A1 * 10/2020 Brondex ................... E06B 9/50
2020/0332596 A1 * 10/2020 Sonzini ..................... E06B 9/90
2021/0032931 A1 * 2/2021 Jang .......................... E06B 9/72
2023/0417105 A1 * 12/2023 Wang ......................... E06B 9/60
2024/0151103 A1 * 5/2024 Huang ...................... E06B 9/90

FOREIGN PATENT DOCUMENTS

CN 213573819 U 6/2021
DE 1960117 B1 2/1971

OTHER PUBLICATIONS

First Chinese Office Action cited in CN202411611928.3, mailed Jan. 7, 2025, 10 pages.

* cited by examiner

*Primary Examiner* — Beth A Stephan
(74) *Attorney, Agent, or Firm* — Cooper Legal Group, LLC

(57) ABSTRACT

The present invention provides a power system for a roller apparatus, including a unidirectional resistance module. The unidirectional resistance module includes a unidirectional transmission assembly and a resistance member. The unidirectional resistance module provides a unidirectional resistance when a curtain body is released from a rolling tube. This resistance compensates for the tolerance between the self-weight of the curtain body and the total rebound force of the power coil spring module, allowing the curtain body to stay stable at a desired height and improving the smoothness in retracting the curtain body of a cordless roller apparatus.

12 Claims, 10 Drawing Sheets

POWER SYSTEM FOR ROLLER APPARATUS AND ROLLER APPARATUS

CROSS-REFERENCE TO RELATED APPLICATIONS

The present disclosure claims priority to Chinese Patent Application No. 202411611928.3, filed on Nov. 13, 2024, which is incorporated herein by reference.

TECHNICAL FIELD

The present invention relates to the technical field of roller equipment, particularly to a power system for a roller apparatus and a roller apparatus including such power system.

BACKGROUND

The global roller market has shown steady growth in recent years. With the acceleration of urbanization and the requirements of the residents for higher-quality living environments, roller apparatuses, with their unique functions and aesthetic designs, have played a significant role in modern architectural design. Roller apparatuses typically include roller curtains, roller doors, and the like. In some emerging markets, the demand for products like roller curtains continues to grow, driving rapid development across the entire industry.

A roller apparatus drives an entire curtain body to be wound up and down using a rolling tube, so as to lift and lower the roller. When being lifted, the curtain body is wound around the rolling tube; and when being lowered, the curtain body is released from the rolling tube and slides down. During use of a roller apparatus, a user usually lowers or lifts the curtain body to a desired position manually or by other means and keeps the curtain body stable at the required position. The existing roller apparatus generally uses the elastic force of a coil spring to balance the weight of the curtain body, keeping the curtain body at the desired position. However, there is often a manufacturing tolerance between the elastic force of the coil spring and the weight of the curtain body. This manufacturing tolerance is likely to cause the curtain body to slide down or roll up, and thus it cannot be kept stable at the desired position.

Additionally, if the curtain body is pulled to its maximum length without a limiting apparatus, it is likely to continuously pull the curtain body due to inertia or failure to stop force in time, causing the curtain body to slide down beyond a limited position, thus possibly damaging a joint between the curtain body and the rolling tube.

SUMMARY

To address at least one of the above problems, the present invention provides a power system for a roller apparatus and a roller apparatus.

The present invention is implemented using the following solutions.

The present invention provides a power system for a roller apparatus, including:

a central rod, where the central rod is configured to be fixedly mounted on a bracket;

at least one power coil spring module, where the power coil spring module includes a housing and a coil spring, an inner end of the coil spring is connected to the central rod, an outer end of the coil spring is connected to the housing, the housing is configured to be mounted and snap-fitted with a rolling tube, and the rolling tube is configured to wind a curtain body; and a unidirectional resistance module, where the unidirectional resistance module includes a resistance module housing, a rotating shaft, a unidirectional transmission assembly, a mounting base, and a resistance member, where the rotating shaft is mounted with the central rod, the resistance module housing is configured to be snap-fitted with the rolling tube, and the resistance module housing, the mounting base, and the rotating shaft are mounted in a relatively rotatable manner; the resistance member is disposed between the resistance module housing and the mounting base, and the resistance member is configured to provide rotational resistance between the resistance module housing and the mounting base; and the unidirectional transmission assembly is mounted between the mounting base and the rotating shaft, such that the mounting base rotates unidirectionally relative to the rotating shaft, thus providing a unidirectional resistance when the curtain body is released from the rolling tube.

In an embodiment, the unidirectional transmission assembly includes a plurality of swing pawls and multiple tooth parts disposed at an outer periphery of the rotating shaft; and each of the plurality of swing pawls is disposed on the mounting base in a pivotable and swingable manner, the tooth parts obliquely protrude out of an outer peripheral surface of the rotating shaft relative to a radial direction of the rotating shaft, and each of the plurality of swing pawls is capable of cooperating with the tooth parts, thus achieving unidirectional rotation of the mounting base relative to the rotating shaft.

In an embodiment, the tooth part includes a guiding surface and a locking surface, a first end of the swing pawl has a first protrusion facing the tooth part, a second end of the swing pawl has a second protrusion facing the tooth part, and a side of the swing pawl facing the tooth part is provided with a first guide surface and a second guide surface; and when the mounting base rotates relative to the rotating shaft along a first direction, the second guide surface is capable of abutting against the tooth part, such that the second protrusion is capable of being pushed by the tooth part to enable the swing pawl to swing, and the swing of the swing pawl enables the first protrusion to abut against the locking surface of one of the tooth parts of the rotating shaft due to rotation, thus locking the rotation of the mounting base relative to the rotating shaft along the first direction.

In an embodiment, when the mounting base rotates relative to the rotating shaft along a second direction, the tooth part is capable of abutting against the first guide surface, the first protrusion at the first end of the swing pawl is capable of being pushed by the tooth part to enable the swing pawl to swing, the guiding surface of the tooth part is capable of abutting against the first protrusion of the swing pawl, and the tooth part is capable of rotating past the first protrusion until separating from the first protrusion, the second direction being opposite to the first direction for rotation.

In an embodiment, the number of the tooth parts is twice the number of the swing pawls.

In an embodiment, the resistance member is a resistance torsion spring, an inner ring of the resistance torsion spring tightly sleeves the mounting base, a pushing bump is disposed in an inner cavity of the resistance module housing, two ends of the resistance torsion spring respectively extend to two sides of the pushing bump, when the resistance module housing rotates relative to the mounting base, the pushing bump is capable of pushing the resistance torsion spring to rotate relative to the mounting base, and a frictional force is generated between the resistance torsion spring and the mounting base and serves as rotational resistance.

In an embodiment, a first end of the central rod is connected to a main support base, the main support base includes a rotary bearing, a support cylinder, and a buckle component, the support cylinder is provided with a rod mounting hole, the rod mounting hole is used for fitting with the first end of the central rod, the rotary bearing is configured to be snap-fitted with the rolling tube, and the rotary bearing rotatably sleeves the support cylinder; and an end surface of the buckle component is provided with a mounting structure that is mounted to the bracket, the buckle component is mounted in an inner cavity of the support cylinder, and a mounting angle of the buckle component relative to the support cylinder is adjustable.

In an embodiment, the buckle component is mounted in the inner cavity of the support cylinder in an axially displaceable manner, and when the buckle component is displaced to a first position relative to the support cylinder, the buckle component is snap-fitted with the support cylinder; multiple first engaging teeth protrude from an outer peripheral surface of the buckle component, the multiple first engaging teeth are uniformly distributed around the outer peripheral surface of the buckle component, multiple second engaging teeth protrude from an inner wall surface of the cavity of the support cylinder, the multiple second engaging teeth are uniformly distributed around the inner wall surface of the cavity of the support cylinder, the first engaging teeth are capable of engaging with the second engaging teeth, thus limiting radial rotation of the buckle component relative to the support cylinder, and the buckle component is at the first position relative to the support cylinder; and when the buckle component is displaced to a second position relative to the support cylinder, the first engaging teeth are capable of disengaging from the second engaging teeth, and the mounting angle of the buckle component relative to the support cylinder is adjustable.

In an embodiment, a second end of the central rod is connected to a rotation turn limiting apparatus, the rotation turn limiting apparatus includes a stroke rod, a limiting nut, and a fixed nut, one end of the stroke rod is connected to the second end of the central rod, the limiting nut is configured to be engaged with the rolling tube, the stroke rod includes a rod-shaped body and a limiting head part, an outer surface of the rod-shaped body has an external thread, the external thread is capable of fitting with an internal thread of the limiting nut, the fixed nut is threaded onto the stroke rod, and the fixed nut is limited and fixed on the stroke rod via a locking screw; and the limiting nut is located between the limiting head part and the fixed nut.

In an embodiment, the limiting head part is provided with a first limiting block, two opposite sides of the limiting nut are respectively provided with a second limiting block and a third limiting block, a side of the fixed nut facing the limiting nut is provided with a fourth limiting block, the first limiting block is capable of abutting against the second limiting block, and the third limiting block is capable of abutting against the fourth limiting block.

In an embodiment, the power system is applied to a cordless roller apparatus.

The present invention also provides a roller apparatus, including the power system for a roller apparatus as described in any one of the foregoing embodiments.

The technical solutions provided by the present invention have the following technical effects:

1. The power system for a roller apparatus provided by the present invention includes a unidirectional resistance module. The unidirectional resistance module includes a resistance module housing, a rotating shaft, a unidirectional transmission assembly, a mounting base, and a resistance member. The resistance member is configured to provide rotational resistance between the resistance module housing and the mounting base. The unidirectional transmission assembly is mounted between the mounting base and the rotating shaft, such that the mounting base rotates unidirectionally relative to the rotating shaft, thus providing a unidirectional resistance when the curtain body is released from the rolling tube. This resistance compensates for the tolerance between the self-weight of the curtain body and the total rebound force of the power coil spring module, allowing the curtain body to stay stable at a desired height. It also improves the feel of pulling down a cordless roller apparatus and enables smooth retraction of the curtain body, improving the smoothness in retracting the curtain body of the cordless roller apparatus.

2. In the power system for a roller apparatus provided by the present invention, the unidirectional transmission assembly includes a swing pawl and multiple tooth parts disposed at an outer periphery of the rotating shaft; and the swing pawl is disposed on the mounting base in a pivotable and swingable manner, the tooth parts obliquely protrude out of an outer peripheral surface of the rotating shaft relative to a radial direction of the rotating shaft, and the swing pawl is capable of fitting with the tooth parts, thus achieving unidirectional rotation of the mounting base relative to the rotating shaft. The interaction between the swing pawl and the tooth parts generates almost no noise, improving the user experience. The swing pawl may be a rigid structure, which is simple in structure and easy to manufacture.

DESCRIPTION OF EMBODIMENTS

Figure 1:
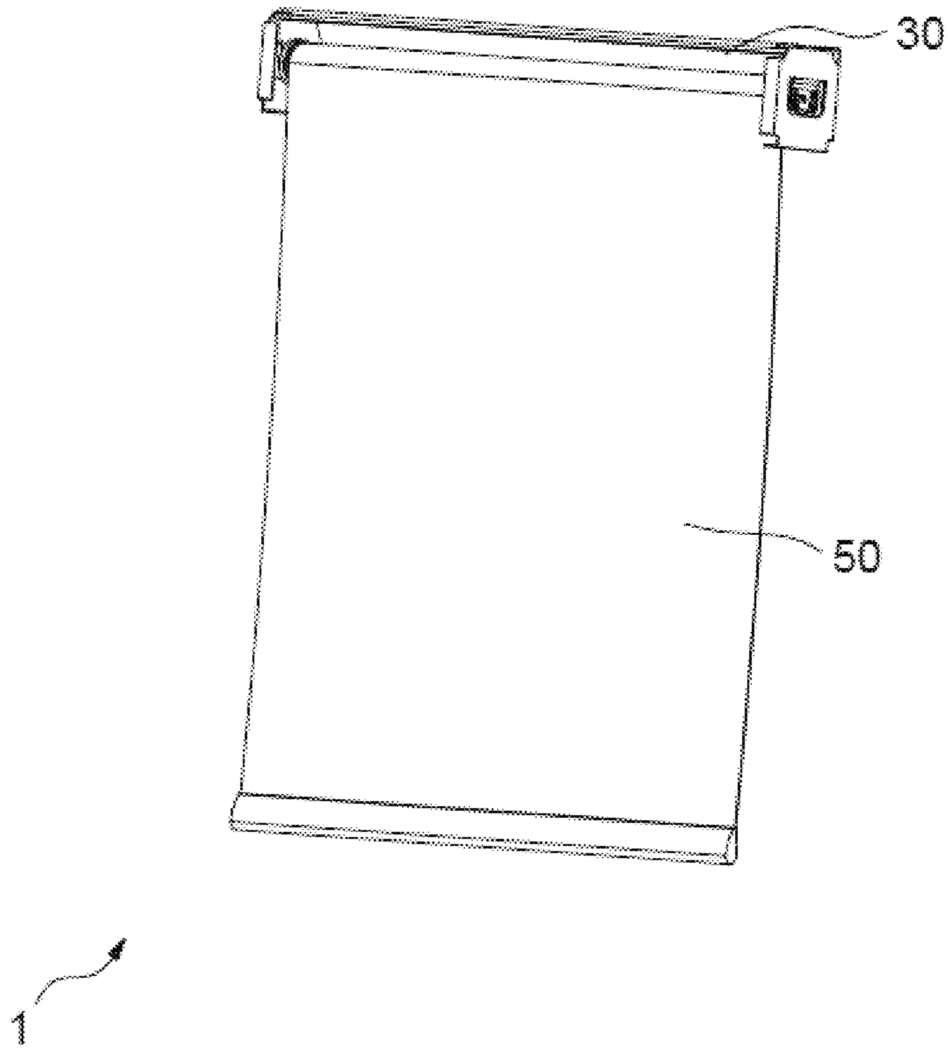
FIG. 1 is a three-dimensional diagram of a roller apparatus according to a specific embodiment of the present invention.

To further describe the embodiments, the present invention provides accompanying drawings. These drawings are part of the disclosure of the present invention and are primarily used to illustrate embodiments and can be used with reference to the relevant description in the specification to explain the operating principles of the embodiments. Referring to this content, ordinary skilled persons in this field should understand other possible implementations and the advantages of the present invention. The components in the figure are not drawn to scale, and similar component symbols are typically used to represent similar components.

The present invention is further described with reference to the accompanying drawings and specific implementations.

As shown in FIGS. 1 to 14, an embodiment provides a roller apparatus 1. The roller apparatus 1 is cordless and a curtain body can be manually pushed or pulled, such that the curtain body stays at the desired height. In this embodiment, the roller apparatus 1 is exemplified as a roller curtain for description. In other embodiments, the roller apparatus 1 may also be a roller door.

In this embodiment, the roller apparatus 1 includes a power system 10, an auxiliary support base 20, a mounting support assembly 30, a rolling tube 40, and a curtain body 50. A first end 51 of the curtain body 50 is connected to the rolling tube 40, and the curtain body 50 may be wound around the rolling tube 40. A second end 52 of the curtain body 50 is provided with a balancing rod 53, which can increase the self-weight of the curtain body 50, thus keeping it stable at the desired position. Certainly, in some embodiments, the balancing rod 53 may not be provided.

The rolling tube 40 is a hollow tubular structure, and the rolling tube 40 has a first end portion 41 and a second end portion 42 opposite each other. The power system 10 is arranged at the first end portion 41 of the rolling tube 40. The power system 10 includes a power coil spring module 13 and a central rod 12. The power coil spring module 13 includes a coil spring module housing 131 and a coil spring 133. An inner end of the coil spring 133 is connected to the central rod 12, and an outer end is connected to the coil spring module housing 131, the coil spring module housing 131 being snap-fitted with the rolling tube 40. The torque generated by the coil spring 133 cancels out the gravity of the curtain body 50 at a different height, allowing the curtain body 50 to stay at any height.

The auxiliary support base 20 is provided at the second end portion 42 of the rolling tube 40. The auxiliary support base 20 is configured to support the second end portion 42 of the rolling tube 40, and the rotating part of the auxiliary support base 20 can rotate coaxially with the rolling tube 40.

During operation, for the power system 10, when the curtain body 50 is manually pushed or pulled, the rolling tube 40 rotates, driving the coil spring module housing 131 to rotate, and causing the coil spring 133 to generate a rebound force and produce torque. This torque balances with the weight of the curtain body 50, allowing the curtain body 50 to stay at the desired height.

In this embodiment, two power coil spring modules 13 are provided. Certainly, more or fewer power coil spring modules 13 may be configured based on actual needs. However, during actual application, there is a tolerance between the weight of the curtain body 50 and the total rebound force of the power coil spring modules 13, causing the curtain body 50 to possibly slide down automatically and not stay stable at the required height.

To address this, the power system 10 of this embodiment further includes a unidirectional resistance module 14. The unidirectional resistance module 14 can provide unidirectional resistance when the curtain body 50 is released from the rolling tube 40 and slides down, and provide almost no resistance when the curtain body 50 is wound onto the rolling tube 40 and rises.

The unidirectional resistance module 14 includes a resistance module housing 141, a rotating shaft 142, a swing pawl 143, a mounting base 144, and a resistance torsion spring 145. The resistance module housing 141 includes a first housing 1411 and a second housing 1412, with the first housing 1411 fixedly connected to the second housing 1412. A cavity is formed in the resistance module housing 141, and the rotating shaft 142, the swing pawl 143, the mounting base 144, and the resistance torsion spring 145 are mounted in the cavity. The resistance module housing 141 is provided with a central hole 146, and the rotating shaft 142 is rotatably mounted in the central hole 146. The outer periphery of the rotating shaft 142 is provided with tooth parts 1421.

A central rod hole 1422 is provided in the middle of the rotating shaft 142 for the central rod 12 to pass through. The central rod hole 1422 matches the central rod 12 in shape, and the rotating shaft 142 sleeves the central rod 12, thereby restricting the rotation of the rotating shaft 142 relative to the central rod 12.

A through hole 1446 is provided in the middle of the mounting base 144, and the through hole 1446 is used for the rotating shaft 142 to pass through, such that the mounting base 144 rotatably sleeves the rotating shaft 142. The mounting base 144 includes a spring mounting part 1441 and a pawl mounting part 1442 that are interconnected. A resistance member is provided between the resistance module housing 141 and the mounting base 144. The resistance member is configured to provide rotational resistance between the resistance module housing 141 and the mounting base 144. In this embodiment, the resistance member is a resistance torsion spring 145. Certainly, in some embodiments, the resistance member may be a friction plate or other structures.

In this embodiment, the resistance torsion spring 145 sleeves the outer periphery of the spring mounting part 1441, and an inner ring of the resistance torsion spring 145 tightly sleeves the mounting base 144. A pushing bump 14121 is disposed in an inner cavity of the resistance module housing 141, and two ends of the resistance torsion spring 145 respectively extend to two sides of the pushing bump 14121 of the resistance module housing 141. When the resistance module housing 141 rotates relative to the mounting base 144, the pushing bump 14121 is capable of pushing the resistance torsion spring 145 to rotate relative to the mounting base 144, and a frictional force is generated between the resistance torsion spring 145 and the mounting base 144 and serves as rotational resistance. The rotational frictional force can be adjusted by adjusting the sleeving force of the inner ring of the resistance torsion spring 145 for the mounting base 144.

A unidirectional transmission assembly is provided between the rotating shaft 142 and the mounting base 144. In this embodiment, the unidirectional transmission assembly includes a swing pawl 143 and multiple tooth parts 1421 disposed at an outer periphery of the rotating shaft 142. Certainly, in some embodiments, the unidirectional transmission assembly may be a ratchet wheel structure with ratchet teeth.

In this embodiment, the swing pawl 143 is mounted in the cavity of the pawl mounting part 1442. The pawl mounting part 1442 includes a mounting bottom plate 1443 and an enclosing part 1444 that extends from the edge of the mounting bottom plate 1443 in a direction perpendicular to the mounting bottom plate 1443. The mounting bottom plate 1443 and the enclosing part 1444 jointly form the cavity of the pawl mounting part 1442. The mounting bottom plate 1443 of the pawl mounting part 1442 is provided with a mounting hole 1445, and the bottom surface of the swing pawl 143 is provided with a pivot column 1435. The pivot column 1435 can fit with the mounting hole 1445, such that the swing pawl 143 is pivotally mounted on the pawl mounting part 1442.

There are three swing pawls 143. The three swing pawls 143 surround the outer periphery of the rotating shaft 142, and the swing pawls 143 can cooperate with the tooth parts 1421 at the outer periphery of the rotating shaft 142, thereby achieving unidirectional rotation of the rotating shaft 142 relative to the mounting base 144. The outer periphery of the rotating shaft 142 is provided with six tooth parts 1421. The tooth parts 1421 obliquely protrude out of an outer peripheral surface of the rotating shaft 142 relative to a radial direction of the rotating shaft 142. The tooth part 1421 includes a guiding surface 14211 and a locking surface 14212. A first end of the swing pawl 143 has a first protrusion 1431 facing the tooth part 1421, and a second end of the swing pawl 143 has a second protrusion 1434 facing the tooth part 1421. A side of the swing pawl 143 facing the tooth part 1421 is provided with a first guide surface 1432 and a second guide surface 1433. The number of tooth parts 1421 is twice the number of swing pawls 143, so that each swing pawl 143 corresponds to two adjacent tooth parts 1421.

Figure 2:
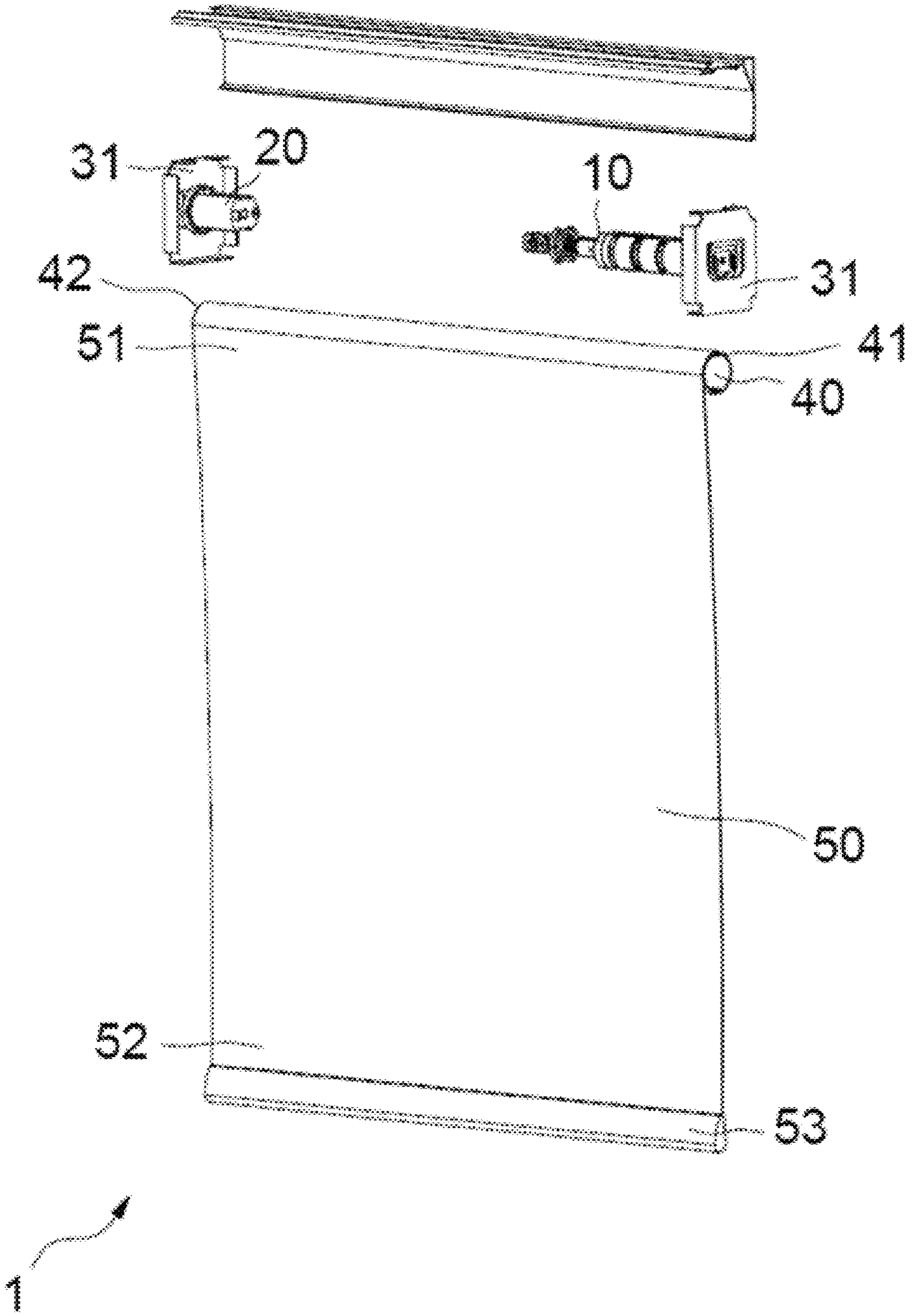
FIG. 2 is a partially exploded view of the roller apparatus according to the embodiment.
Figure 3:
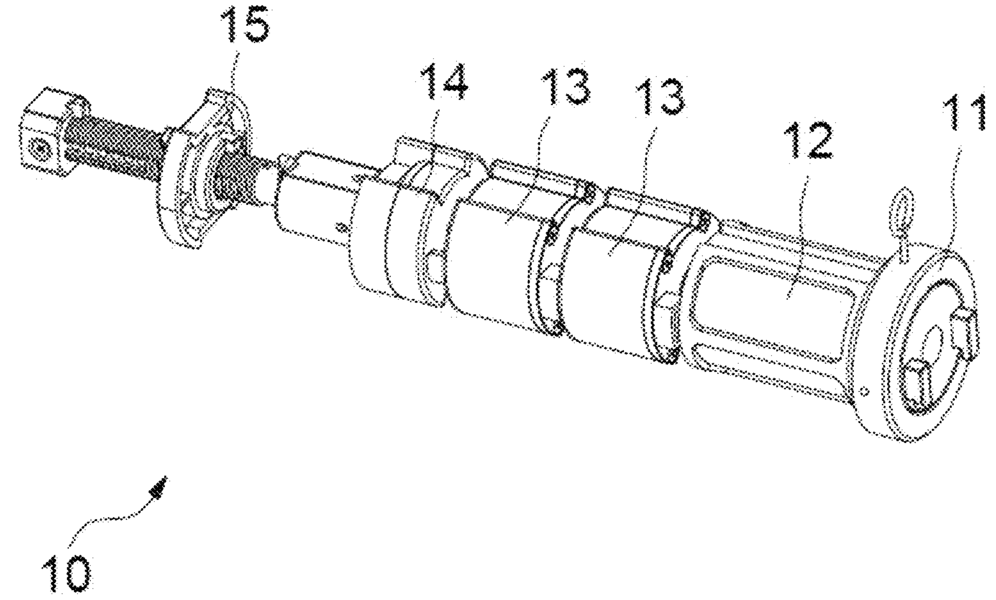
FIG. 3 is a three-dimensional diagram of a power system according to the embodiment.
Figure 4:
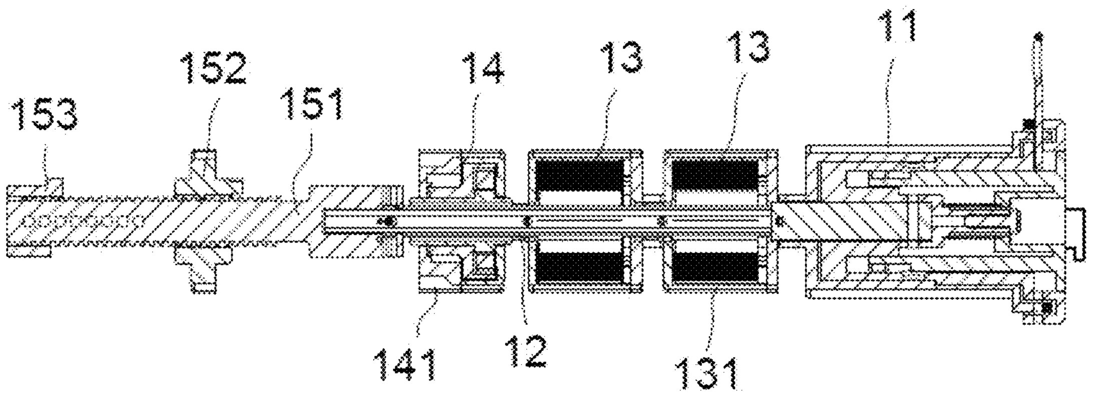
FIG. 4 is a fully cross-sectional view of the power system according to the embodiment.
Figure 5:
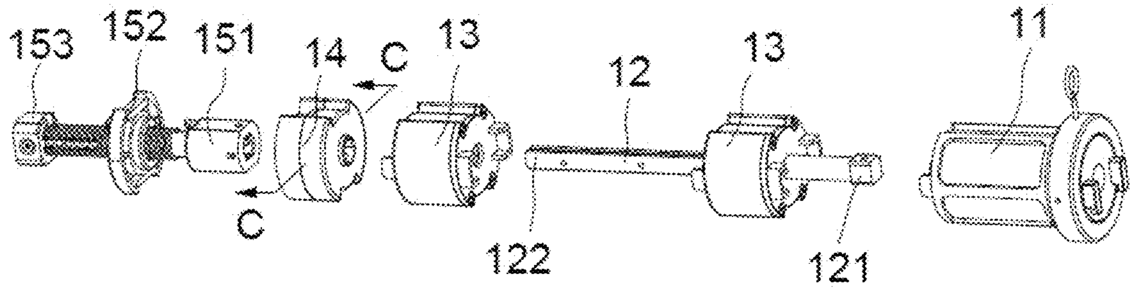
FIG. 5 is a partially exploded view of the power system according to the embodiment.
Figure 6:
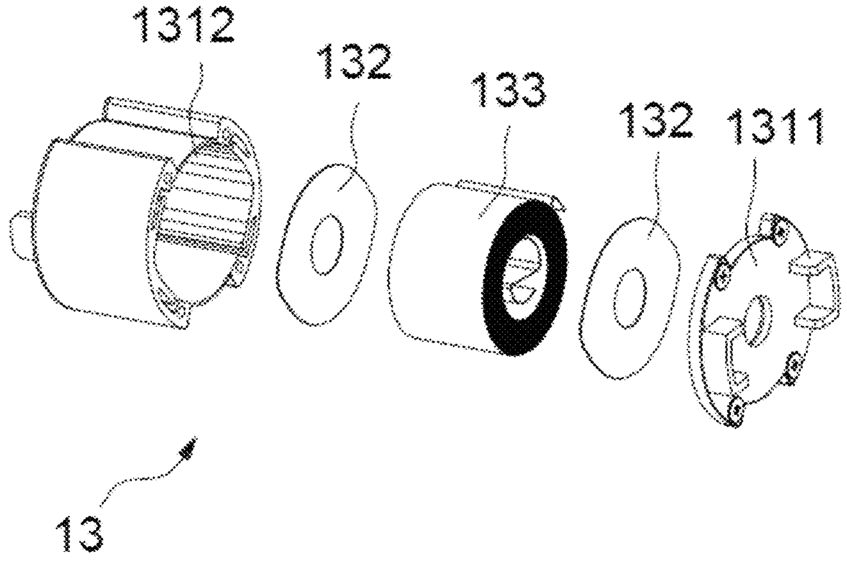
FIG. 6 is an exploded view of a power coil spring module according to the embodiment.
Figure 7:
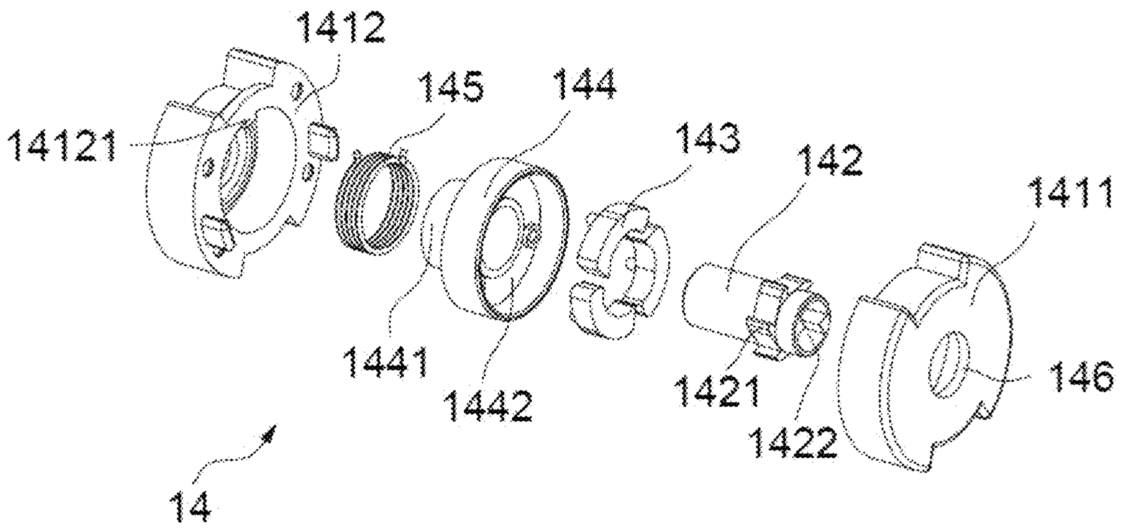
FIG. 7 is an exploded view of a unidirectional resistance module according to the embodiment.
Figure 8:
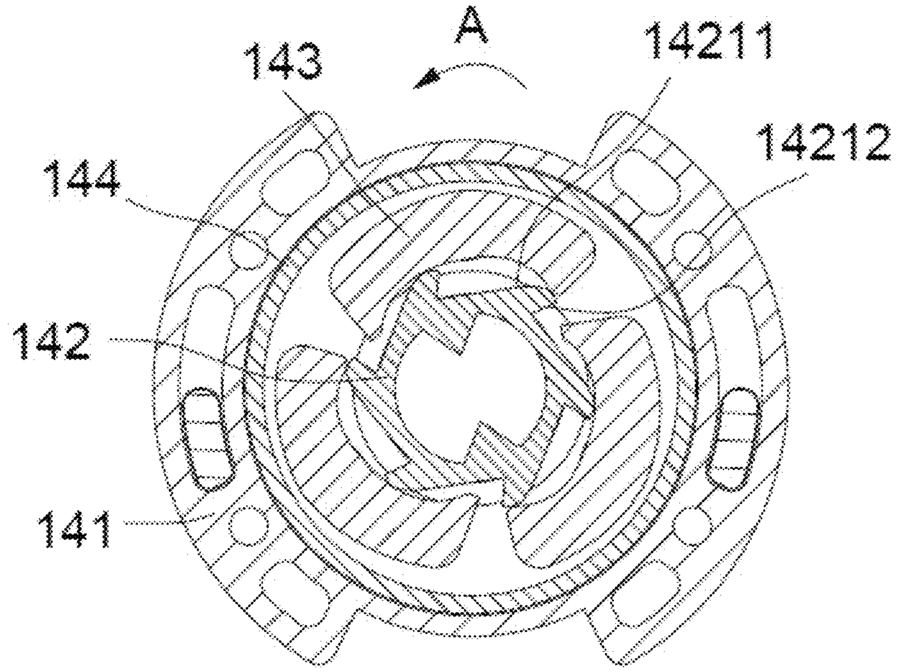
FIG. 8 is a fully cross-sectional view of the unidirectional resistance module in FIG. 5 along direction C-C.

Referring to FIGS. 1, 2, and 8, when the curtain body 50 slides down, the rolling tube 40 drives the resistance module housing 141 to rotate along a direction A. Under the action of the pushing bump 14121 of the resistance module housing 141, the resistance torsion spring 145 is driven to rotate along the direction A, and the mounting base 144 is driven to rotate along the direction A.

When the mounting base 144 rotates relative to the rotating shaft 142 along the direction A, the swing pawl 143 is driven to rotate around the central axis of the mounting base 144 along the direction A, causing the tooth part 1421 to abut against the second guide surface 1433. The second protrusion 1434 at the second end of the swing pawl 143 is pushed by the tooth part 1421, causing the swing pawl 143 to swing, and the first protrusion 1431 at the first end of the swing pawl 143 enters between the two adjacent tooth parts 1421. When the mounting base 144 continues to rotate relative to the rotating shaft 142 along the direction A, the first protrusion 1431 abuts against the locking surface 14212 of the tooth part 1421, locking the rotation of the mounting base 144 relative to the rotating shaft 142 along the direction A. In addition, the resistance module housing 141 is continuously driven to rotate along the direction A. Under the continuous action of the pushing bump 14121 of the resistance module housing 141, the resistance torsion spring 145 rotates relative to the mounting base 144, and the resistance torsion spring 145 and the mounting base 144 press against each other and generate balanced rotary frictional resistance therebetween. This rotary frictional resistance can compensate for the tolerance between the weight of the curtain body 50 and the total rebound force of the power coil spring module 13, allowing the curtain body 50 to stay stable at the desired height and improving the feel of pulling down the roller apparatus 1.

Figure 9:
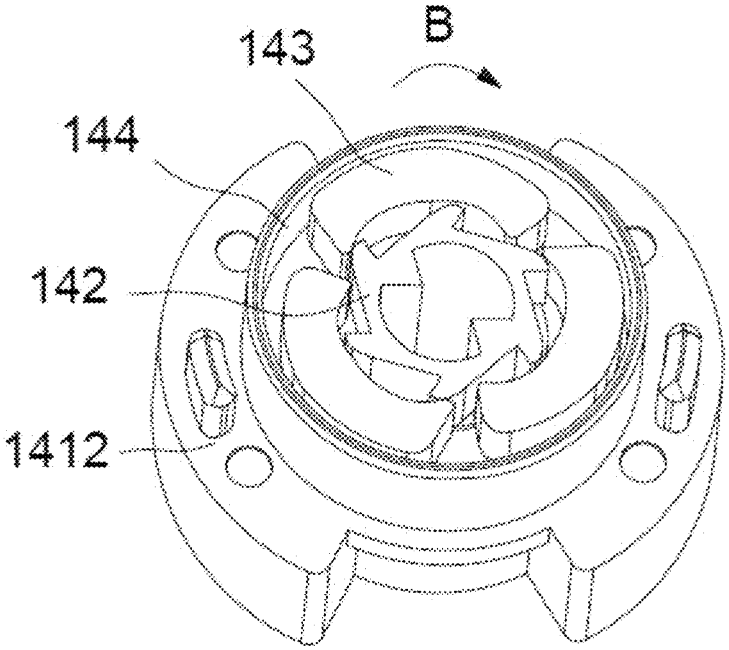
FIG. 9 is a three-dimensional diagram of the unidirectional resistance module without part of a housing according to the embodiment.
Figure 10:
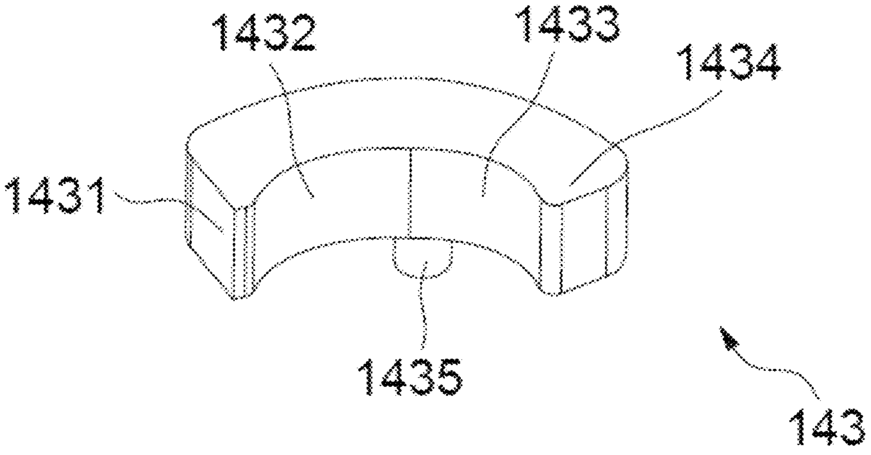
FIG. 10 is a three-dimensional diagram of a pawl according to the embodiment.
Figure 11:
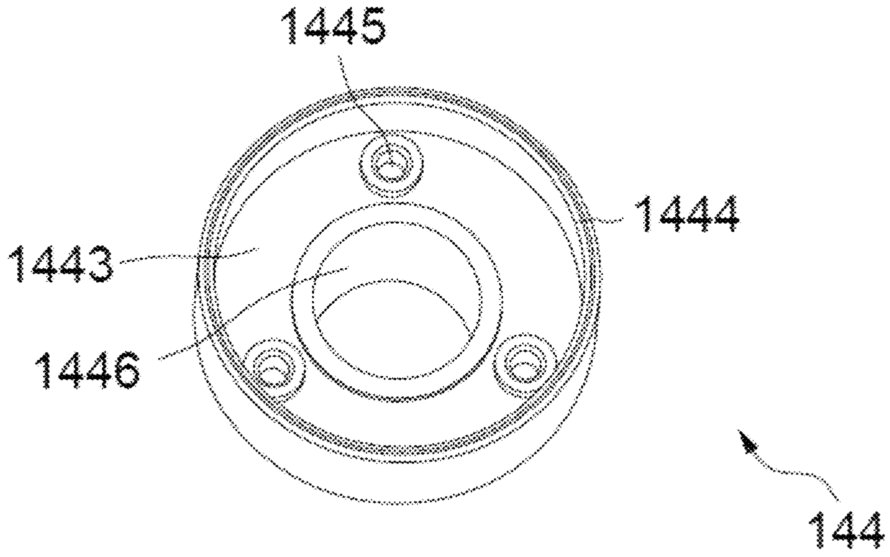
FIG. 11 is a three-dimensional diagram of a spring seat according to the embodiment.
Figure 12:
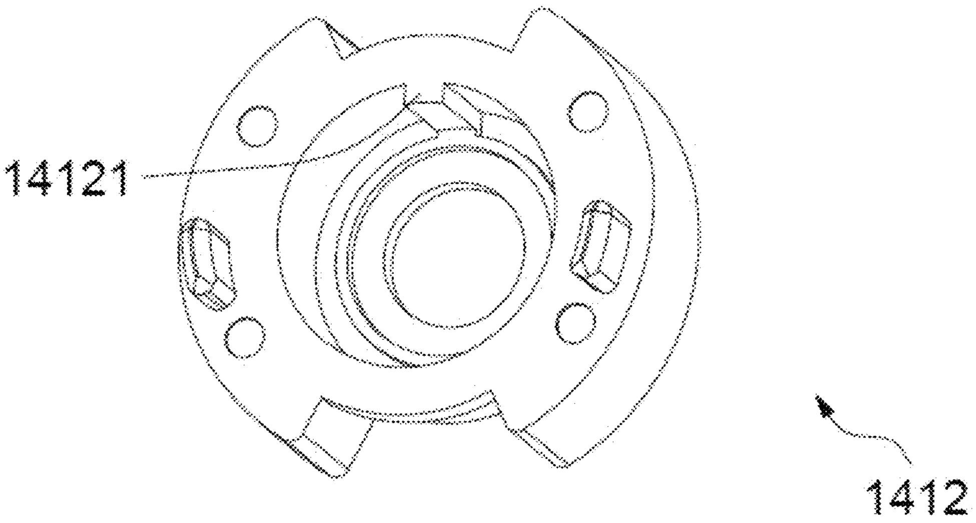
FIG. 12 is a three-dimensional diagram of a second housing according to the embodiment.

In this embodiment, referring to FIG. 9, during the retracting process of the curtain body 50, the rolling tube 40 drives the resistance module housing 141 to rotate along a direction B. Under the action of the pushing bump 14121 of the resistance module housing 141, the resistance torsion spring 145 is driven to rotate along the direction B and the mounting base 144 is driven to rotate along the direction B.

When the mounting base 144 rotates relative to the rotating shaft 142 along the direction B, the swing pawl 143 is driven to rotate and swing around the central axis of the mounting base 144 along the direction B, causing the tooth part 1421 to abut against the first guide surface 1432. The first protrusion 1431 at the first end of the swing pawl 143 is pushed by the tooth part 1421, as shown in FIG. 9, causing the swing pawl 143 to swing. The guiding surface 14211 of the tooth part 1421 abuts against the first protrusion 1431 of the swing pawl 143 and rotates past the first protrusion 1431 until separating from the first protrusion 1431. In addition, the second protrusion 1434 at the second end of the swing pawl 143 is on one side of the guiding surface 14211 of another tooth part 1421. The swing pawl 143 is continuously driven to rotate around the central axis of the mounting base 144 along the direction B. The second protrusion 1434 at the second end of the swing pawl 143 is pushed by the tooth part 1421. Because the guiding surface 14211 of the preceding tooth part 1421 has already separated from the first protrusion 1431 of the swing pawl 143, the swing pawl 143 swings, allowing the guiding surface 14211 of another tooth part 1421 to rotate past the second protrusion 1434 until separating from the second protrusion 1434. The above process is repeated continuously at a relative position between the tooth part 1421 and the swing pawl 143, allowing the mounting base 144 to rotate almost without resistance relative to the rotating shaft 142 along the direction B. In addition, the resistance torsion spring 145 does not rotate relative to the mounting base 144, generating no rotational frictional force therebetween. Thus, during the retracting process of the curtain body 50, the curtain body 50 can be smoothly retracted under the rebound force of the coil spring 133, improving the smoothness in retracting the curtain body 50 of the roller apparatus 1.

The swing pawl 143 works with the tooth parts 1421 to form a unidirectional rotation mechanism. In other embodiments, the unidirectional rotation mechanism may take the form of a ratchet and pawl. However, the ratchet and pawl have a spring, and the spring always pushes the pawl towards the ratchet, generating noise when the ratchet and pawl rotate relative to each other. In this embodiment, the interaction between the swing pawl 143 and the tooth parts 1421 generates almost no noise, improving the user experience. The swing pawl 143 may be a rigid structure, which is simple in structure and easy to manufacture.

The first end 121 of the central rod 12 is connected to a main support base 11. The main support base 11 includes a rotary bearing 115, a support cylinder 114, and a buckle component 113. The support cylinder 114 is provided with a cavity with an opening in a single surface, such that the support cylinder 114 has a cylinder bottom surface 1147 and a cylinder side wall 1141. The cylinder bottom surface 1147 is recessed inward to form a rod mounting hole 1145, and the rod mounting hole 1145 is used for fitting with the first end 121 of the central rod 12. The wall surface of the rod mounting hole 1145 is provided with a pinhole 1146 for inserting a pin to limit and mount the first end 121 of the central rod 12 in the rod mounting hole 1145. The limiting and mounting herein include limiting for relative movement and limiting for relative rotation. The rotary bearing 115 is of a cylindrical tubular structure having a cylindrical cavity with an opening in a single surface. The rotary bearing 115 rotatably sleeves the outer peripheral surface of the support cylinder 114.

The rotary bearing 115 is snap-fitted with the rolling tube 40, allowing the rotary bearing 115 to rotate coaxially with the rolling tube 40. Referring to FIGS. 2, 3, 13, 14, and 17, the outer surface of the rotary bearing 115 is provided with a snap-fitting groove 1151. The rolling tube 40 includes a rolling tube body 401, and the inner cavity of the rolling tube body 401 is provided with a snap-fitting protrusion 402. The snap-fitting groove 1151 can fit with the snap-fitting protrusion 402, allowing the rotary bearing 115 to be snap-fitted with the rolling tube 40. The power coil spring module 13, the unidirectional resistance module 14, and the limiting nut 152 of the rotation turn limiting apparatus 15 have similar structures to be snap-fitted with the rolling tube 40. This is not repeatedly described herein.

Referring to FIGS. 2, 3, and 13-15, the bottom surface of the cavity of the rotary bearing 115 has an opening for the central rod 12 to pass through. The rotary bearing 115 rotatably sleeves the support cylinder 114, and the end surface of the buckle component 113 is provided with a mounting structure that is mounted to the bracket 31. In this embodiment, the mounting structure of the buckle component 113 and the bracket 31 is a buckle 1134 protruding from the end surface of the buckle component 113. The buckle component 113 is mounted in the inner cavity of the support cylinder 114, and the mounting angle of the buckle component 113 relative to the support cylinder 114 is adjustable.

A pin 116 can lock the relative positions of the rotary bearing 115 and the support cylinder 114, thereby preventing the rotary bearing 115 from loosening and deflecting during transportation.

Figure 14:
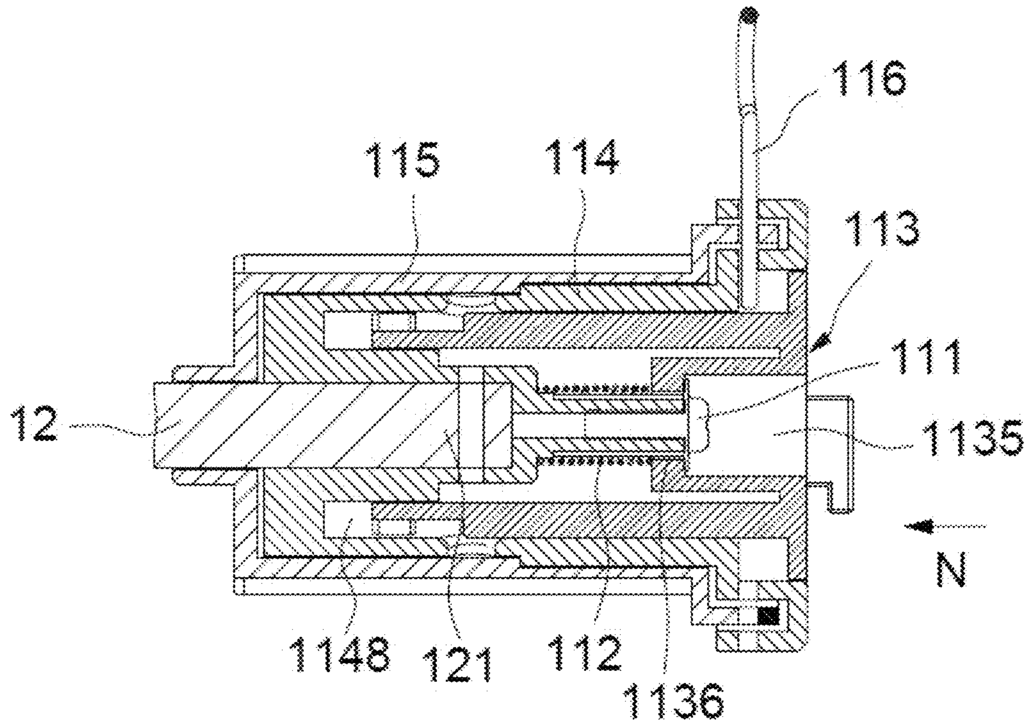
FIG. 14 is a fully cross-sectional view of the main support base according to the embodiment.

The buckle component 113 is mounted in the inner cavity of the support cylinder 114 in an axially displaceable manner. When the buckle component 113 is displaced to the first position relative to the support cylinder 114, the buckle component 113 is snap-fitted with the support cylinder 114, as shown in FIG. 14. When the buckle component 113 is displaced to the second position relative to the support cylinder 114, the buckle component 113 disengages from the support cylinder 114. In addition, the mounting angle of the buckle component 113 relative to the support cylinder 114 is adjustable, allowing the angle of the buckle 1134 protruding from the end surface of the buckle component 113 to be adjusted, and helping to mount the buckle on the bracket 31 in a different shape. After adjustment, the buckle component 113 is displaced to the first position relative to the support cylinder 114, and the buckle component 113 is snap-fitted with the support cylinder 114 again. In this embodiment, referring to FIG. 14, pushing the buckle component 113 inwards along a direction N can displace the buckle component 113 from the first position to the second position relative to the support cylinder 114.

The buckle component 113 is of a cylindrical tubular structure having a cylindrical cavity with an opening in a single surface. An end surface 1137 of a cover of the buckle component 113 is arranged outward away from the inner cavity of the support cylinder 114. The end surface 1137 of the cover forms a recessed part 1135, and the bottom surface of the recessed part 1135 is provided with a cover through-hole 1136. In the cavity of the support cylinder 114, a support convex column 1142 is formed on the cylinder bottom surface 1147. The cover through-hole 1136 is slidably fitted with the support convex column 1142, allowing the buckle component 113 to be mounted in the inner cavity of the support cylinder 114 in an axially displaceable manner.

Figure 13:
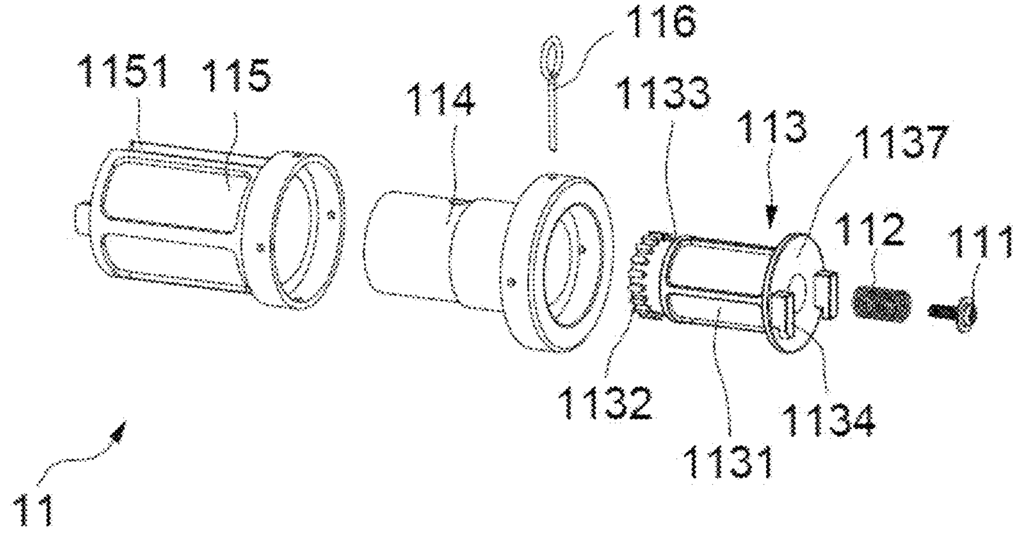
FIG. 13 is an exploded view of a main support base according to the embodiment.

Referring to FIGS. 13 and 14, multiple first engaging teeth 1132 protrude from an outer peripheral surface of the buckle component 113, and the multiple first engaging teeth 1132 are uniformly distributed around the outer peripheral surface of the buckle component 113. Multiple second engaging teeth 1143 protrude from an inner wall surface of the cavity of the support cylinder 114, and the multiple second engaging teeth 1143 are uniformly distributed around the inner wall surface of the cavity of the support cylinder 114. The first engaging teeth 1132 can engage with the second engaging teeth 1143 to limit the radial rotation of the buckle component 113 relative to the support cylinder 114. In addition, the buckle component 113 is at the first position relative to the support cylinder 114. Pushing the buckle component 113 inwards along the direction N can cause the first engaging teeth 1132 to disengage from the second engaging teeth 1143, thereby allowing the buckle component 113 to rotate radially relative to the support cylinder 114. This adjusts the angle of the buckle 1134 protruding from the end surface of the buckle component 113, helping to mount the buckle on the bracket 31 in a different shape.

The outer peripheral surface of the buckle component 113 is provided with a first avoidance groove 1133 on the side of the first engaging teeth 1132, and the inner wall surface of the cavity of the support cylinder 114 is provided with a second avoidance groove 1148 on the side of the second engaging teeth 1143. When the buckle component 113 is at the second position relative to the support cylinder 114, the first avoidance groove 1133 and the second avoidance groove 1148 can respectively avoid the second engaging teeth 1143 and the first engaging teeth 1132, thereby allowing the buckle component 113 to rotate radially relative to the support cylinder 114.

The support convex column 1142 is also sleeved with an elastic element 112, and the elastic element 112 is, for example, a spring. The two ends of the elastic element 112 respectively abut against the support cylinder 114 and the buckle component 113, thereby biasing the buckle component 113 towards the first position relative to the support cylinder 114, that is, the engaging position shown in FIG. 14. A connection hole 1144 is formed at the center of the support convex column 1142, and the connection hole 1144 is used for connecting a fixing pin 111. The head of the fixing pin 111 is accommodated in the recessed part 1135, thereby limiting the buckle component 113.

Figure 19:
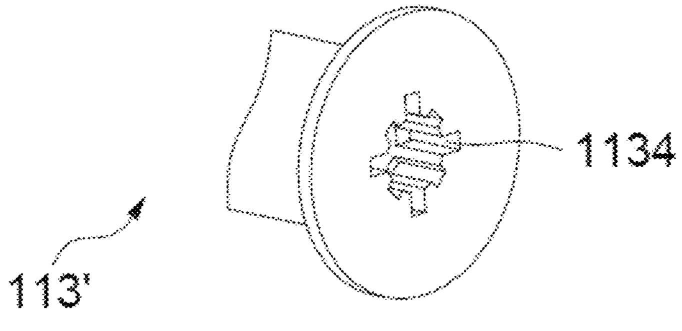
FIG. 19 is a three-dimensional diagram of a buckle component according to another embodiment.

In addition, the buckle component 113 can be replaced by removing the fixing pin 111, so as to adapt to different brackets 31. For example, referring to FIG. 19, the end surface of the cover of the buckle component 113' is provided with an open slot similar to a "*" shape to match a bracket with a protruding structure.

Figure 16:
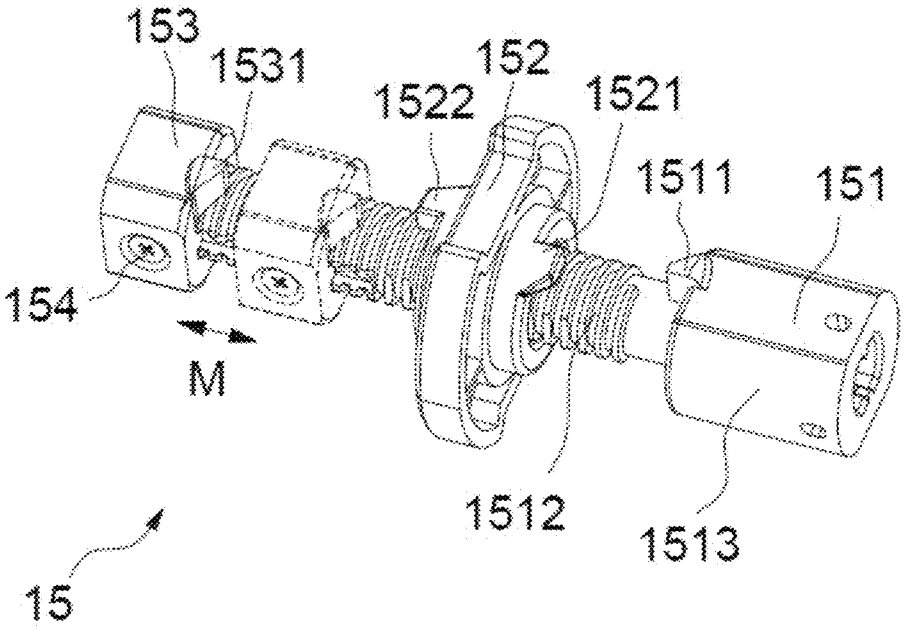
FIG. 16 is a three-dimensional diagram of a rotation turn limiting apparatus according to the embodiment.
Figure 17:
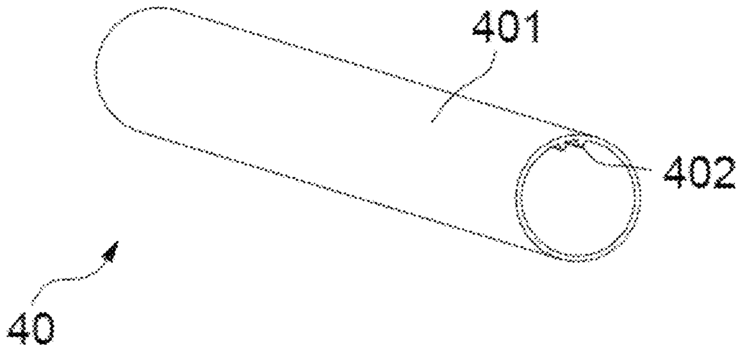
FIG. 17 is a three-dimensional diagram of a rolling tube according to the embodiment.
Figure 18:
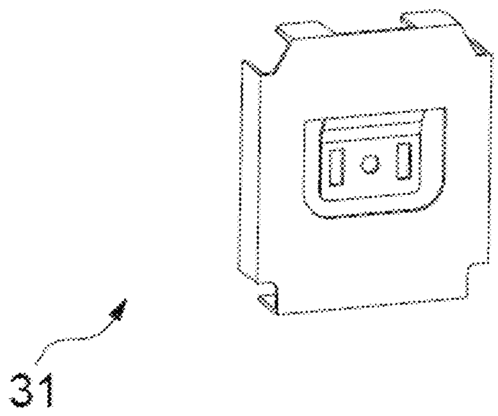
FIG. 18 is a three-dimensional diagram of a bracket according to the embodiment.

Referring to FIGS. 3 to 5 and FIG. 16, especially FIG. 16, the second end 122 of the central rod 12 is also connected to a rotation turn limiting apparatus 15. The rotation turn limiting apparatus 15 includes a stroke rod 151, a limiting nut 152, and a fixed nut 153. One end of the stroke rod 151 is connected to the second end 122 of the central rod 12, and the rotation of the stroke rod 151 relative to the central rod 12 is limited. The rolling tube 40 is engaged with the limiting nut 152, so that the limiting nut 152 rotates coaxially with the rolling tube 40. The stroke rod 151 includes a rod-shaped body and a limiting head part 1513. The outer surface of the rod-shaped body of the stroke rod 151 has an external thread 1512, and the external thread 1512 can fit with the internal thread of the limiting nut 152, so that the limiting nut 152 moves axially relative to the stroke rod 151 while rotating relative to the stroke rod 151. The fixed nut 153 is threaded onto the stroke rod 151. The fixed nut 153 is limited and fixed on the stroke rod 151 via a locking screw 154. The limiting nut 152 is located between the limiting head part 1513 and the fixed nut 153, thereby limiting the rotation turns of the limiting nut 152. This prevents the curtain body 50 from being pulled beyond its maximum length; otherwise, a pulling force downward is likely to be continuously applied to the curtain body 50 due to inertia or failure to stop in time, and consequently, the power system of the roller apparatus 1 exceeds the limit position to fail and be damaged.

Figure 15:
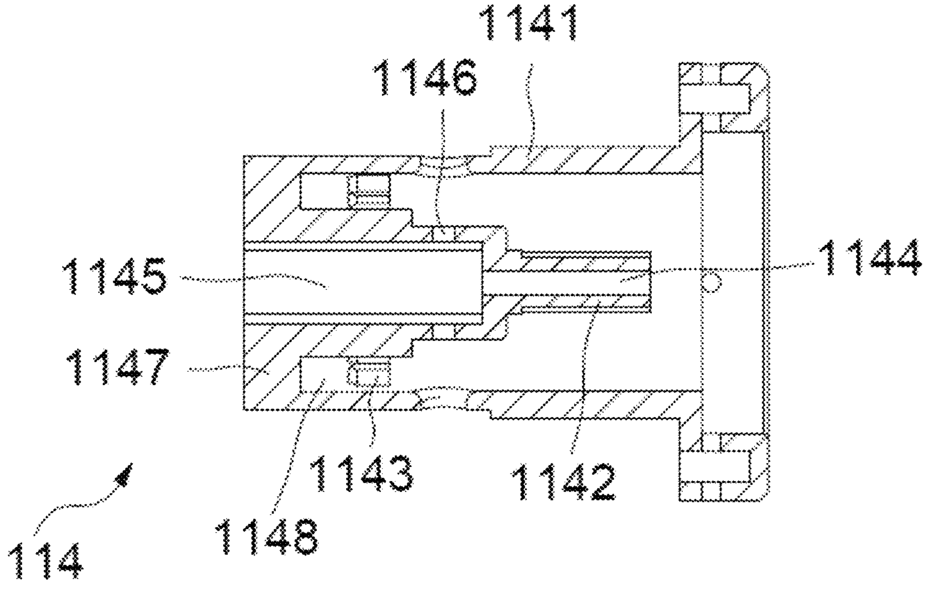
FIG. 15 is a fully cross-sectional view of a support cylinder according to the embodiment.

Loosening the locking screw 154 can adjust the position of the fixed nut 153 on the stroke rod 151 along a direction M, as shown in FIG. 15, thereby adjusting the maximum number of rotation turns of the limiting nut 152, so as to adapt to curtain bodies with different winding and retracting lengths.

The limiting head part 1513 is provided with a first limiting block 1511. The two opposite sides of the limiting nut 152 are respectively provided with a second limiting block 1521 and a third limiting block 1522. The side of the fixed nut 153 facing the limiting nut 152 is provided with a fourth limiting block 1531. The first limiting block 1511 can abut against the second limiting block 1521, and the third limiting block 1522 can abut against the fourth limiting block 1531, thereby more precisely and reliably limiting the rotation turns of the limiting nut 152.

The auxiliary support base 20 may have a structure similar to that of the main support base 11 to support the second end portion 42 of the rolling tube 40.

Although this embodiment provides description where the power coil spring module 13, the unidirectional resistance module 14, and the rotation turn limiting apparatus 15 are located at the same end of the rolling tube 40, it is conceivable to those skilled in the art that at least one of the power coil spring module 13, the unidirectional resistance module 14, and the rotation turn limiting apparatus 15, along with the remaining components, may be located at two different ends of the rolling tube 40. This is also a feasible technical solution.

Although the present invention is specifically illustrated and described with reference to preferred implementations, those skilled in the art should understand that without departing from the spirit and scope of the present invention as defined in the appended claims, various changes can be made to the present invention in form and details and fall within the protection scope of the present invention.

The invention claimed is:

1. A power system for a roller apparatus, comprising:

a central rod, wherein the central rod is configured to be fixedly mounted on a bracket;

at least one power coil spring module, wherein the power coil spring module comprises a housing and a coil spring, an inner end of the coil spring is connected to the central rod, an outer end of the coil spring is connected to the housing, the housing is configured to be mounted and snap-fitted with a rolling tube, and the rolling tube is configured to wind a curtain body; and a unidirectional resistance module, wherein the unidirectional resistance module comprises a resistance module housing, a rotating shaft, a unidirectional transmission assembly, a mounting base, and a resistance member, wherein the rotating shaft is mounted with the central rod, the resistance module housing is configured to be snap-fitted with the rolling tube, the resistance module housing, the mounting base, and the rotating shaft are mounted in a relatively rotatable manner, the resistance member is disposed between the resistance module housing and the mounting base, the resistance member is configured to provide rotational resistance between the resistance module housing and the mounting base, and the unidirectional transmission assembly is mounted between the mounting base and the rotating shaft, such that the mounting base rotates unidirectionally relative to the rotating shaft, thus providing a unidirectional resistance when the curtain body is released from the rolling tube.

2. The power system for a roller apparatus according to claim 1, wherein the unidirectional transmission assembly comprises a plurality of swing pawls and multiple tooth parts disposed at an outer periphery of the rotating shaft, each of the plurality of swing pawls is disposed on the mounting base in a pivotable and swingable manner, each of the multiple tooth parts obliquely protrude out of an outer peripheral surface of the rotating shaft relative to a radial direction of the rotating shaft, and each of the plurality of swing pawls is configured to cooperate with the multiple tooth parts, thus achieving unidirectional rotation of the mounting base relative to the rotating shaft.

3. The power system for a roller apparatus according to claim 2, wherein each of the multiple tooth parts comprises a guiding surface and a locking surface, a first end of each of the plurality of swing pawls has a first protrusion facing a corresponding one of the multiple tooth parts, a second end of each of the plurality of swing pawls has a second protrusion facing the corresponding one of the multiple tooth parts, a side of a corresponding one of the plurality of swing pawls facing the corresponding one of the multiple tooth parts is provided with a first guide surface and a second guide surface, when the mounting base rotates relative to the rotating shaft along a first direction, the second guide surface is configured to abut against the corresponding one of the multiple tooth parts, such that the second protrusion is configured to be pushed by the corresponding one of the multiple tooth parts to enable the corresponding one of the plurality of swing pawls to swing, and the swing of the corresponding one of the plurality of swing pawls enables the first protrusion to abut against the locking surface of the corresponding one of the multiple tooth parts of the rotating shaft due to rotation, thus locking rotation of the mounting base relative to the rotating shaft along the first direction.

4. The power system for a roller apparatus according to claim 3, wherein when the mounting base rotates relative to the rotating shaft along a second direction, each of the multiple tooth parts is configured to abut against the first guide surface, the first protrusion at the first end of the corresponding one of the plurality of swing pawls is configured to be pushed by the multiple tooth parts to enable the corresponding one of the plurality of swing pawl to swing, the guiding surface of each of the multiple tooth parts is configured to abut against the first protrusion of the corresponding one of the plurality of swing pawl, and each of the multiple tooth parts is configured to rotate past the first protrusion until separating from the first protrusion, the second direction being opposite to the first direction for rotation.

5. The power system for a roller apparatus according to claim 2, wherein a number of the multiple tooth parts is twice a number of the plurality of swing pawls.

6. The power system for a roller apparatus according to claim 1, wherein the resistance member is a resistance torsion spring, an inner ring of the resistance torsion spring sleeves the mounting base, a pushing bump is disposed in an inner cavity of the resistance module housing, two ends of the resistance torsion spring respectively extend to two sides of the pushing bump, when the resistance module housing rotates relative to the mounting base, the pushing bump is configured to push the resistance torsion spring to rotate relative to the mounting base, and a frictional force is generated between the resistance torsion spring and the mounting base and serves as the rotational resistance.

7. The power system for a roller apparatus according to claim 1, wherein a first end of the central rod is connected to a main support base, the main support base comprises a rotary bearing, a support cylinder, and a buckle component, the support cylinder is provided with a rod mounting hole, the rod mounting hole is used for fitting with the first end of the central rod, the rotary bearing is configured to be snap-fitted with the rolling tube, the rotary bearing rotatably sleeves the support cylinder, an end surface of the buckle component is provided with a mounting structure that is configured to be mounted to the bracket, the buckle component is mounted in an inner cavity of the support cylinder, and a mounting angle of the buckle component relative to the support cylinder is adjustable.

8. The power system for a roller apparatus according to claim 7, wherein the buckle component is mounted in the inner cavity of the support cylinder in an axially displaceable manner, when the buckle component is displaced to a first position relative to the support cylinder, the buckle component is snap-fitted with the support cylinder, multiple first engaging teeth protrude from an outer peripheral surface of the buckle component, the multiple first engaging teeth are uniformly distributed around the outer peripheral surface of the buckle component, multiple second engaging teeth protrude from an inner wall surface of the inner cavity of the support cylinder, the multiple second engaging teeth are uniformly distributed around the inner wall surface of the inner cavity of the support cylinder, the multiple first engaging teeth are configured to engage with the multiple second engaging teeth, thus limiting radial rotation of the buckle component relative to the support cylinder, the buckle component is at the first position relative to the support cylinder, when the buckle component is displaced to a second position relative to the support cylinder, the multiple first engaging teeth are configured to disengage from the multiple second engaging teeth, and the mounting angle of the buckle component relative to the support cylinder is adjustable.

9. The power system for a roller apparatus according to claim 1, wherein a second end of the central rod is connected to a rotation turn limiting apparatus, the rotation turn limiting apparatus comprises a stroke rod, a limiting nut, and a fixed nut, one end of the stroke rod is connected to the second end of the central rod, the limiting nut is configured to be engaged with the rolling tube, the stroke rod comprises a rod-shaped body and a limiting head part, an outer surface of the rod-shaped body has an external thread, the external thread is configured to fit with an internal thread of the limiting nut, the fixed nut is threaded onto the stroke rod, movement of the fixed nut is limited and the fixed nut is fixed on the stroke rod via a locking screw, and the limiting nut is located between the limiting head part and the fixed nut.

10. The power system for a roller apparatus according to claim 9, wherein the limiting head part is provided with a first limiting block, two opposite sides of the limiting nut are respectively provided with a second limiting block and a third limiting block, a side of the fixed nut facing the limiting nut is provided with a fourth limiting block, the first limiting block is configured to abut against the second limiting block, and the third limiting block is configured to abut against the fourth limiting block.

11. The power system for a roller apparatus according to claim 1, wherein the power system is applied to a cordless roller apparatus.

12. A roller apparatus, comprising the power system for a roller apparatus according to claim 1.

* * * * *